July 23, 1935.  R. H. UPSON  2,008,885
AIRCRAFT INSTRUMENT
Filed Nov. 22, 1930  4 Sheets-Sheet 1
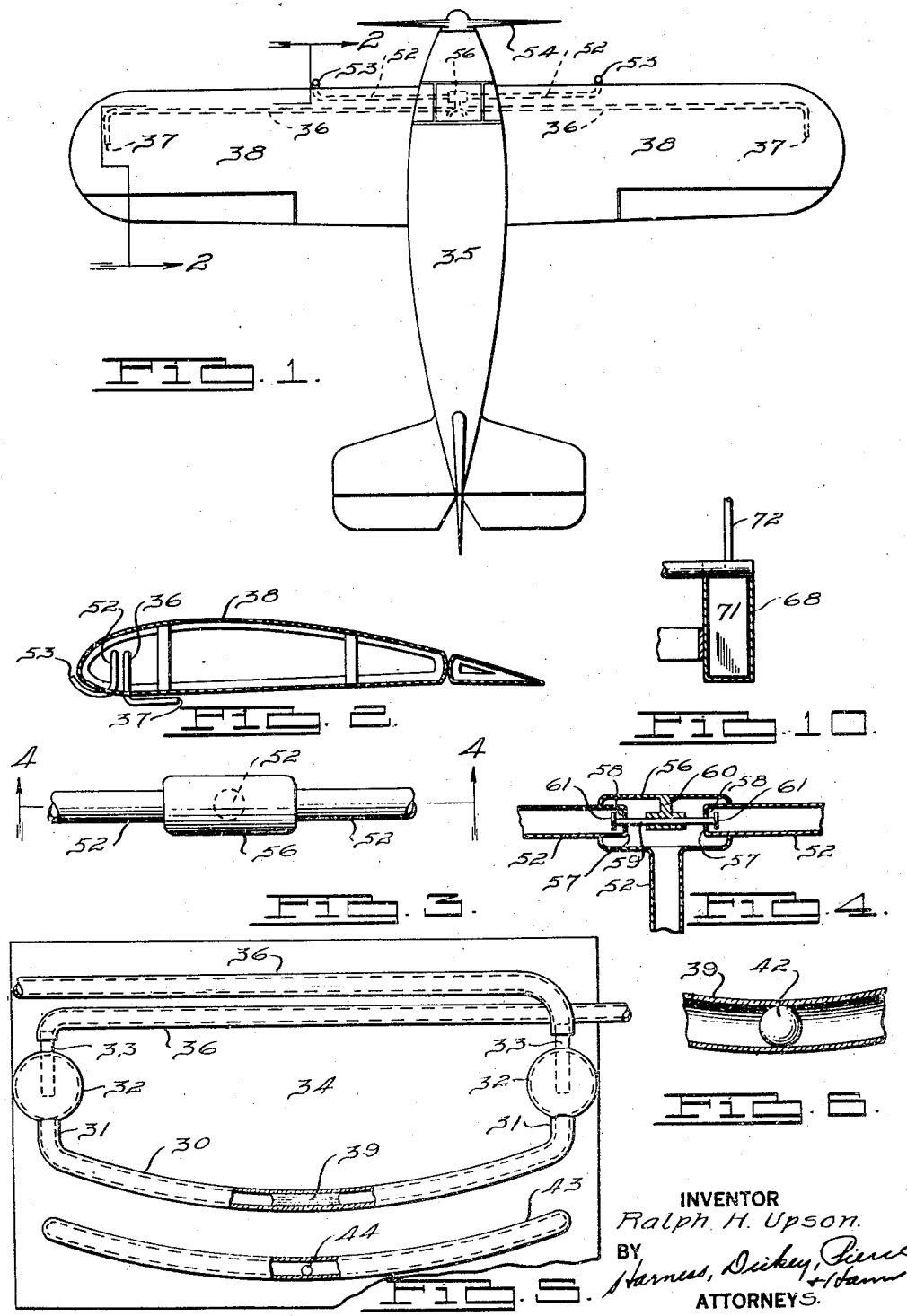
INVENTOR
Ralph H. Upson.
BY
ATTORNEYS.

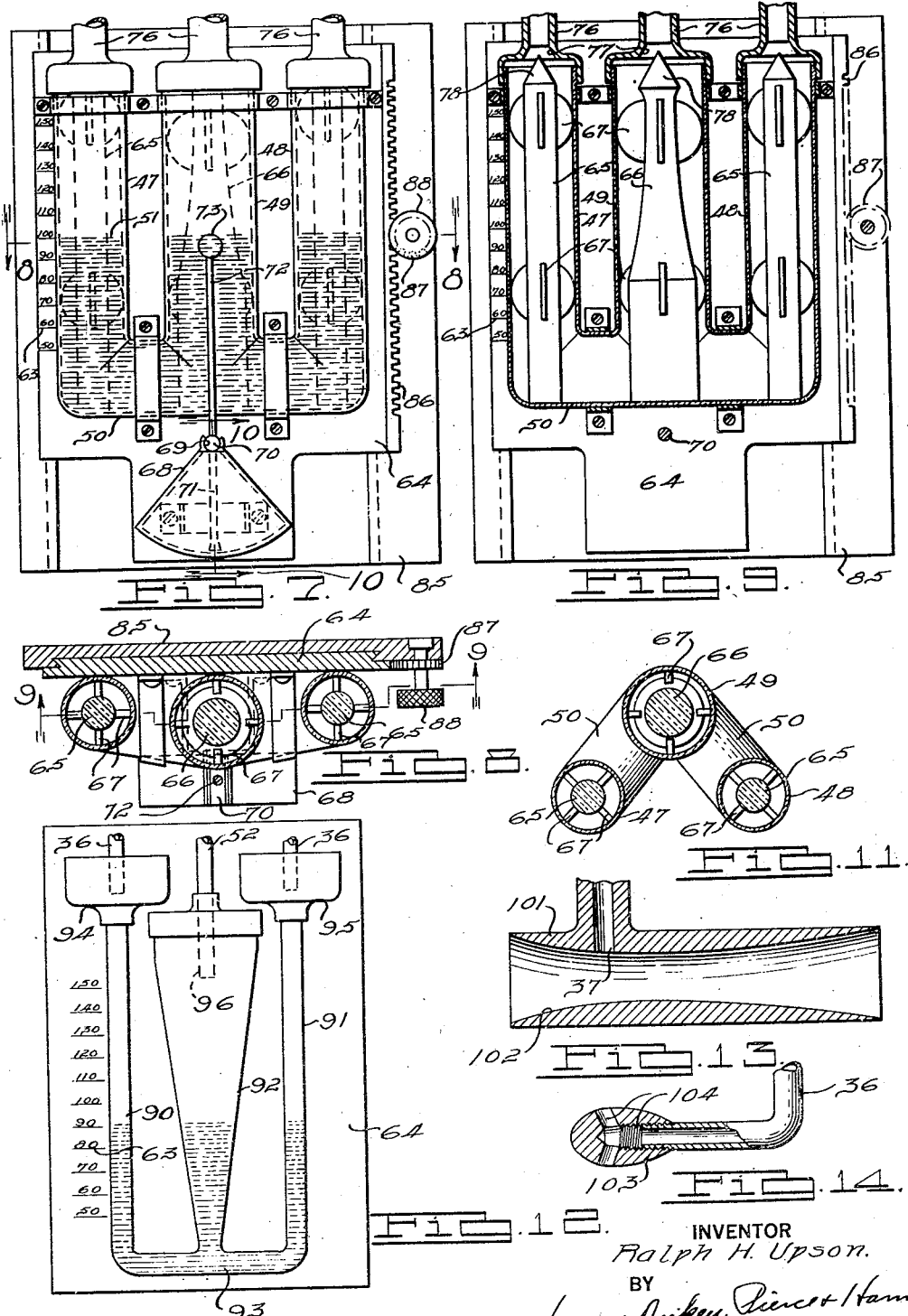

July 23, 1935.  R. H. UPSON  2,008,885
AIRCRAFT INSTRUMENT
Filed Nov. 22, 1930  4 Sheets-Sheet 3
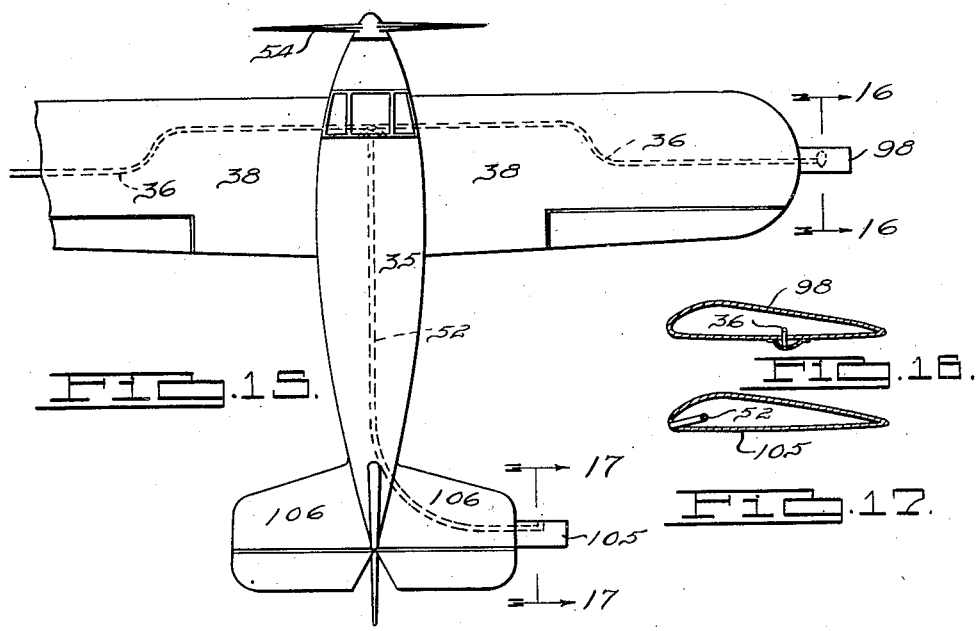
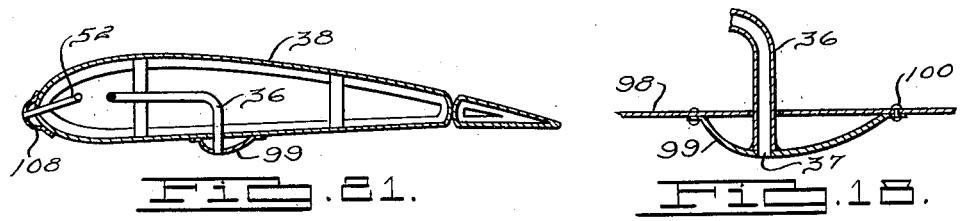
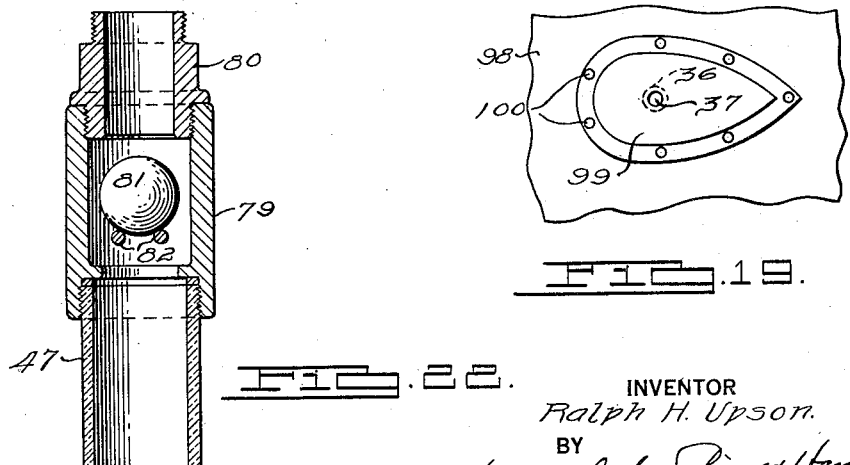
INVENTOR
*Ralph H. Upson.*
BY
*Harness, Dickey, ……… & ………*
ATTORNEYS.

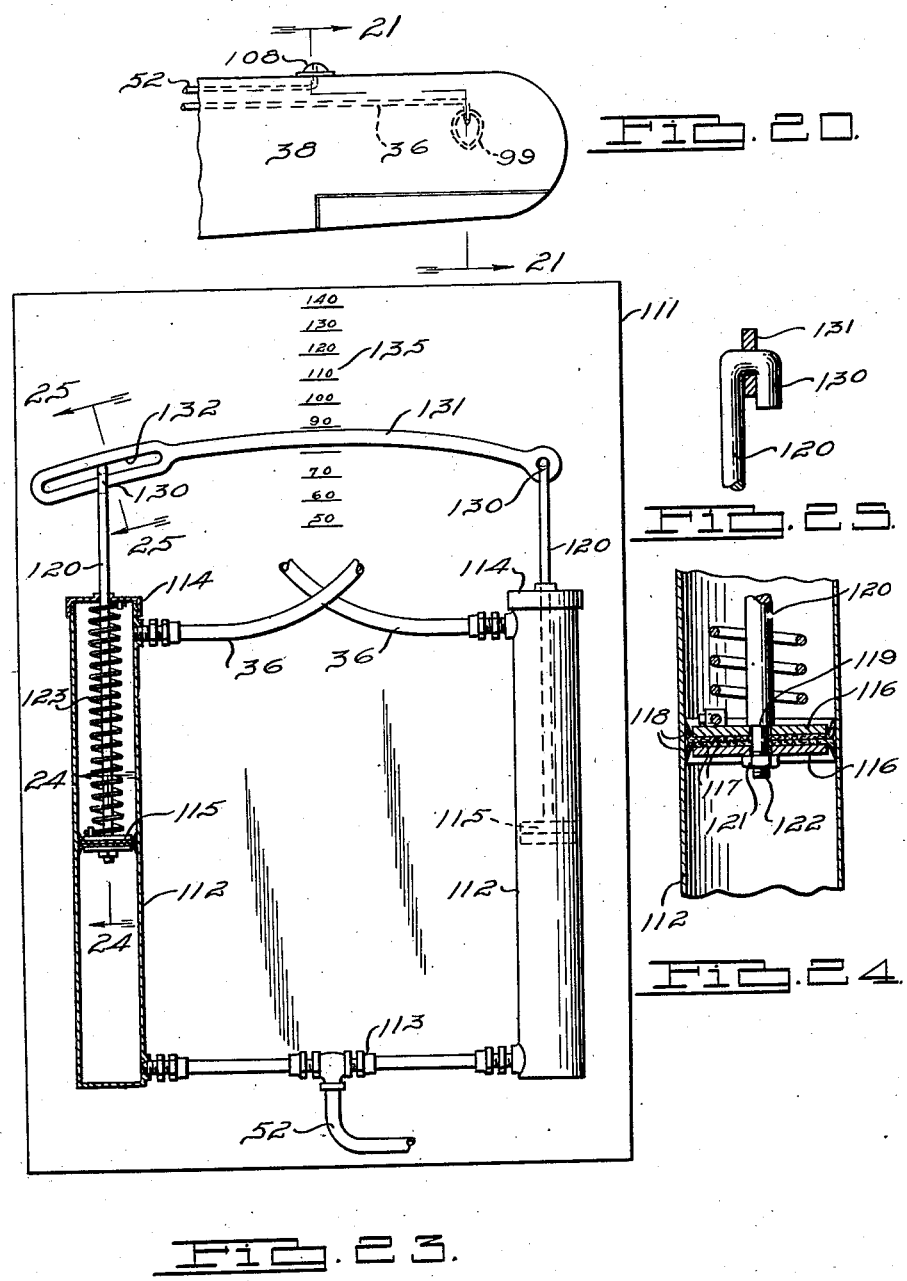

Patented July 23, 1935

2,008,885

UNITED STATES PATENT OFFICE 2,008,885

AIRCRAFT INSTRUMENT

Ralph H. Upson, Detroit, Mich.

Application November 22, 1930, Serial No. 497,505

27 Claims. (Cl. 73—2)

This invention relates to instruments designed for use in connection with the operation and navigation of aircraft particularly airplanes, the principal object being the provision of an instrument for use in blind flying and by the use of which an artificial horizon is provided with reference to which the pilot may control his plane in the same manner as with reference to the natural horizon, when visible.

Various instruments have heretofore been suggested and provided for use in blind flying and by reference to which the pilot may determine his relative position with respect to the natural horizon, but in all cases of which I am aware there are either mechanical complications or the pilot must do a certain amount of interpretation before he can determine his position relative to the natural horizon or to the air through which he is flying. In the latter case, the pilot must be schooled in the use of the several instruments involved and be taught what relation the various movements of these instruments have to the changing relative position of the natural horizon.

The present invention in very simple, trustworthy form eliminates the necessity of interpretation on the part of the pilot in order to determine the relative position of the natural horizon, for the instrument in the present case provides an artificial horizon equal in all respects, as far as control of the ship is concerned, to the natural horizon.

A further object of the present invention is to provide an instrument not only adapted to blind flying, but equally useful when flying under ideal weather conditions and by use of which the attitude of the airplane can be readily and quickly observed.

Another object is to provide an instrument of the type described providing an accurate means of indicating, the point at which an airplane is at or near an angle of stall.

Another object is to provide an instrument of the type described providing a means of measuring the speed of the airplane with respect to the air in which it is flying.

Another object is to provide an instrument of the type described by means of which the best gliding angle is readily determined.

Another object is to provide an instrument of the type described providing means for determining the turn and bank of an airplane.

A further object is the provision of a single instrument taking place of the usual turn and bank indicator, pitch indicator, rate of climb meter, and air speed meter, or any two or more of such instruments.

Further objects are to provide certain novel features of construction in an instrument of the type described, which features will be specifically pointed out or will be apparent in the following specification, reference being had to the accompanying drawings, in which modifications of the invention are illustrated.

In the attached drawings, in which like numerals refer to like parts throughout the specification,—

Fig. 1 is a plan view of an airplane embodying one modification of the present invention.

Fig. 2 is a sectional view taken transversely of one of the wings of the airplane shown in Fig. 1, as on the line 2—2 of Fig. 1.

Fig. 3 is a plan view of the connection between the tubes leading to one part of the instrument.

Fig. 4 is a sectional view taken on the line 4—4 of Fig. 3 and showing the internal construction of the connection.

Fig. 5 is a front elevation of a simple form of the present invention, for lateral use only.

Fig. 6 is a fragmentary sectional view taken vertically through a modification of the upper tube shown in Fig. 5 with the liquid means replaced by mechanical means.

Fig. 7 is a front elevation of a more advanced type of instrument, giving both lateral and longitudinal readings.

Fig. 8 is a horizontal section taken on the line 8—8 of Fig. 7.

Fig. 9 is a vertical sectional view taken on the line 9—9 of Fig. 8.

Fig. 10 (Sheet 1) is a vertical transverse sectional view taken in the direction of the line 10—10 of Fig. 7 showing details of construction of the damper mechanism for the gravity-inertia indicator.

Fig. 11 is a horizontal section taken through a slightly modified form of the instrument shown in Figs. 7, 8 and 9.

Fig. 12 is a front elevation of a modification of the construction shown in Figs. 7, 8 and 9.

Fig. 13 is an enlarged vertical sectional view taken through a suction end-connection for the instruments previously shown and illustrating the preferable construction for low speed aircraft.

Fig. 14 is an enlarged partially broken view through a preferable end connection for certain tubes of the instruments previously described, the end portion being shown in vertical section centrally thereof in order to better illustrate the construction.

Fig. 15 is a fragmentary plan view of an airplane showing a slightly modified arrangement in the positioning of the tube ends for the instrument.

Fig. 16 is an enlarged vertical sectional view taken on the line 16—16 of Fig. 15.

Fig. 17 is an enlarged vertical sectional view taken on the line 17—17 of Fig. 15.

Fig. 18 is an enlarged vertical sectional view of the wing-end connection shown in Fig. 16 in order to better illustrate the construction of the same.

Fig. 19 is a view of the construction shown in Fig. 18 taken from below.

Fig. 20 is a fragmentary plan view of an airplane wing showing a modified arrangement of the tube ends thereon.

Fig. 21 is a vertical sectional view taken on the line 21—21 of Fig. 20.

Fig. 22 is a fragmentary vertical sectional view showing a modified construction for the upper ends of the wells for the instrument shown in Figs. 7, 8 and 9.

Fig. 23 is a front elevation of an instrument constructed in accordance with the present invention and capable of performing the same functions as the instruments previously described with the exception that no hydraulic means are employed in the same.

Fig. 24 is a fragmentary enlarged vertical sectional view taken on the line 24—24 of Fig. 23.

Fig. 25 is an enlarged fragmentary sectional view taken on the line 25—25 of Fig. 23.

Without here going into detailed description of physical causes, it is sufficient to state the well-known fact that the difficulty of so-called "blind flying" is mainly attributable to the lack of a visible horizon. The devising of an artificial horizon is, of course, complicated by the fact that gravity and inertia forces in an airplane are indistinguishable by any direct means. Suppose, for example, that we have a curved tube, such as shown in Fig. 5 mounted in a plane transverse to the airplane axis, in which a small amount of liquid is placed. If the tube is left open and free at the ends, the position of the liquid will determine the direction of the vertical or horizontal in a transverse plane for all conditions not involving a turn.

We have the possibility of a compensating force inherent in the turning movement itself because of the fact that the outer wing in a turn goes at a greater speed than the inner wing. It is insufficient, however, to utilize for this purpose the direct dynamic pressure of the air at the two wing tips because it may be proved, both mathematically and by experiment, that the effect of the pressure difference in this case is exactly counter-balanced by the effect of the centrifugal force due to the air in the pressure tubes themselves. When the connections at the ends of the glass tubes are reversed, on the other hand, the left end being connected to the right wing tip, and vice versa, it is possible then to utilize a suction effect due to the same difference in velocity, which in this case is now increased instead of reduced by the centrifugal force of the air above mentioned. The amount of this suction, deduced by means to be described, may be equated to the centrifugal force acting on the liquid itself in such a way as to keep it substantially in the lowest part of the tube for any small rate of turn, and to give a reading in the right direction even for sharp turns.

In the same way the ratio of air pressures at suitable points may be utilized to give a reading of what I choose to call the aerodynamic horizon in the fore-and-aft or longitudinal sense. In such case the aerodynamic horizon does not bear such close relation to the actual horizon as it does for lateral readings, but serves a similar purpose as far as the control of the airplane is concerned, except that it gives at all times more accurate information to the pilot as to his movements relative to the air than does the natural horizon. In this respect the instrument is somewhat similar in function to the angle of attack meter described in my pending application on Airplane equipment, Serial Number 448,001, filed April 28th, 1930. The present invention, however, employs a velocity effect in addition to the angle of attack, which permits a simplified arrangement of parts, as will hereinafter be described. In its most highly developed form the present invention combines in a single instrument both lateral and longitudinal readings with the optional addition of a gravity-inertia or bank indicator preferably combined in the same instrument. The latter feature is not so important, however, as its indications are at best only refinements of what a good pilot can tell by his own feel.

The simplest form of my invention is disclosed in Figure 5 in which it is shown as comprising a curved tube 30 of glass or other transparent material, the outer ends of which are turned upwardly as at 31 where they join the bulb 32. A tube 33 projects downwardly through the top of each bulb 32 and extends to a point just above the bottom of the bulb. This assemblage may be supported upon a supporting member such as 34, and is adapted to be positioned in an aircraft with the plane of the support 34 perpendicular to the longitudinal axis of the aircraft and with the tube 30 disposed in the manner indicated in Fig. 5 when the aircraft is on an even keel. When the instrument is applied to an airplane such as is generally indicated at 35 in Fig. 1, it may be located on the instrument panel directly in front of the pilot. In such case, the opposite ends of the instrument 33 are each connected by tubes such as 36, to laterally disposed orifices, such as 37 in Figs. 1 and 2, to be more fully described later, which orifices are preferably located adjacent the ends of the wings 38. As previously described, in order to eliminate the counter-balancing effect of the centrifugal force on the operation of the device, the tube 36 connected to the left-hand end of the instrument 33, as indicated in Fig. 5, is extended to the orifice 37 on the right-hand wing, while the tube 36 connected to the right-hand end 33 extends to the orifice 37 on the left-hand wing. The orifices 37, whatever their specific construction may be, are preferably formed to exert a suction within the tubes 36 due to the passage of the aircraft through the air, the type shown in Fig. 2 consisting merely of a rearwardly bent end on the tubes 36 to effect this result.

With this construction it will be apparent that in an aircraft equipped with this device, should the same become out of lateral balance without any change of direction in its longitudinal axis, the suction effect exerted on both of the orifices 37 will be equal and will not affect in itself the relative position of the column of liquid 39 in the tube 30. Consequently gravity acting on the liquid 39 will cause the same to seek its lowest level in the tube 30 and therefore indicate that the natural horizon is no longer in a plane tangent to the center of the tube 30. The liquid 39 being of substantial length may itself be considered as indicating a line parallel to the natural horizon or as the natural horizon itself.

When, as above described, the aircraft is changing the direction of movement of its longitudinal axis, then the liquid 39 is affected by the centrifugal action exerted upon it by the turning movement; but due to the fact that the tubes 36 are crossed and the orifice 37 on the outer side of the turn is moving at a faster rate of speed than the orifice 37 on the inner side of the turn, the suction effect on the outer orifice will be greater than that on the inner nozzle and this will off-set the effect of the centrifugal force. In fact, by suitably proportioning the length of the liquid column the difference in suction applied thereto thru the orifices 37 may be made to approximately balance the centrifugal force, this being particularly true where the aircraft is banking at relatively small angles. This length may be mathematically determined by the following formula (as applied to average atmospheric conditions), assuming a light oil as a liquid.

$$L = \frac{y}{60}\left(1 - \frac{p}{q}\right)$$

Where L equals the column of liquid in inches, $y$ equals the distance in feet between the orifices, $p$ equals the actual pressure on the outlets, and $q$ the full dynamic pressure due to mean velocity of travel. It will be apparent that a cosine error enters into this formula for large banking angles, but I have found that for banking angles of less than 30° the error may be disregarded.

Also in actual practice, when a pressure difference due to a turn acts upon the liquid for any considerable length of time, the liquid seeps back from its theoretical position and starts to accumulate again at the gravity-inertia position. As soon as it fills the tube at the latter point however the pressure again carries it toward the position of the true horizon so that although the reading is intermittent in this case it is still unmistakable, providing the instrument is properly proportioned for the purpose. A reasonable change from the theoretically correct length of liquid, however, is not of serious consequence because the condition of straight level flight is still accurately indicated.

Accordingly, by counterbalancing the effects of centrifugal force due to turning, the instrument still unerringly indicates the direction of recovery to the natural horizon, not only while flying in a straight path, but also while making a turn. The pilot in thus considering the column of liquid 39 controls his aircraft to correct the laterally unbalanced condition by reference to the liquid in the same manner as he would refer to the natural horizon.

The bulbs 32 and projecting tubular elements 33 are preferably provided at the ends of the tube 30 in order to form traps to catch the liquid 39 in cases where the aircraft rolls completely over or assumes an upside-down position, thereby preventing its loss from the instrument. Other means for effecting this trap may, of course, be provided in its stead in accordance with the broader aspects of the invention.

It may be found desirable in some cases that, instead of providing a column of liquid such as 39 in the tube 30, such liquid be replaced by solid means to effect the same result, but without the seepage of liquid above mentioned. In such a case, the bore of the tube 39 being sufficiently perfect, a ball or other solid member such as 42 may be positioned therein in place of the liquid, it being understood that the size and contour of such member 42 in such case co-operates with the bore of the tube 39 to effect a substantial seal in order that an excessive amount of air may not escape past it and thereby affect the accuracy of the reading.

It may also be desirable in some cases to provide an addition to the instrument in the form of a second curved tube such as 43, similar to the conventional bank indicator, preferably positioned below and in proximity to the tube 30 and of a curvature preferably complementary thereto. This tube 43 may be closed at both ends and be internally provided with a ball such as 44 freely movable within the bore of the tube. This ball will, of course, during turning of the aircraft, assume a position in accordance with the resultant force of both the inertia and gravity forces acting upon it. By reason of the fact that the ball 44 will always assume the position of the gravity-inertia resultant, the pilot—by observing the relation of the liquid 39 (or balls 42) relative to the ball 44—will be aware, regardless of banking of the aircraft, of the direction of turning of the aircraft, such turn obviously being in the direction of the liquid 39 (or ball 42) relative to the ball 44.

From elementary physics it will be apparent that instead of the tube being bent on an arc as in Fig. 5, a U-tube may be employed in its stead, and filled to any desirable level. Where such U-tube is employed, the length "L" as given in the above equation corresponds in this case to the distance which the two vertical legs of the U are spaced apart, the latter in practice being compromised to suit practically all the usual airplane designs. Also, in this case instead of considering the direction of length of the column as approximately corresponding to the natural horizon, an imaginary line connecting the tops of the columns in the two legs corresponds to the natural horizon.

Such a U-tube construction is illustrated in Figs. 7 to 10 inclusive, it being understood that the showing in these figures is more or less diagrammatic and in actual practice the height of the device will be proportionally greater in respect to the width than that shown. In this modification a third tube is included to permit indication of the fore and aft horizon as above suggested. This modification also includes in its preferred form a gravity-inertia or bank indicator of a construction modified from that indicated in connection with Fig. 5.

Referring to Figs. 7 to 10 inclusive, I show three transparent vertically disposed parallel tubes 47, 48 and 49 all connected together at their bottom ends by a portion 50, altho the portion 50 may be made of any desired material and secured to the tubes 47, 48 and 49 in any desired manner. In the particular embodiment shown, the portions 47 to 50 inclusive are formed integrally with each other of a transparent material such as glass. The two outer tubes 47 and 48 and their connected lower portion 50 provide the U-tube previously mentioned, the tube 47 being connected to an orifice on the right-hand side of the aircraft, and the tube 48 being connected with an orifice on the left-hand side of the aircraft. In this case, an imaginary line connecting the centers of the level of liquid 51 filling the tubes gives the same information as the liquid 39 in the tube 30 of Fig. 5. The central tube 49 in such a case is connected through conduits such as 52 to an orifice 53, located, for instance, at the leading edge of the wing, preferably outside of the zone of influence of the "wash" from the propeller 54, and so placed relative to the wing (or other surface) that the air pressure induced in the tube will be greater for increasing speeds. In Fig. 2 the orifice is shown as being provided by projecting the outer end of the tube 52 thru the lower covering of the wing and bending it upwardly so that the end of the tube providing the orifice 53 is located slightly below that point on the leading edge of the wing 38 at which the air flowing toward the wing during normal level flight divides, part flowing upwardly over the wing, and part flowing downwardly under the wing. The normal action of the third orifice 53 will be to impress an increasing pressure on the central tube 49 of the instrument as the airplane decreases its angle of attack or increases its speed.

In its preferred form, the orifice 53 is positioned, experimentally in most cases, so that as the angle of attack of the airplane increases and approaches the angle of stall, the resulting change of direction of the air flowing around the orifice 53 will be reversed and will cause a suction to be created within the tube 52, and thus in the central tube 49 of the instrument. It will be observed that under normal flying conditions, with suction being exerted on the tubes 47 and 48 and pressure being exerted within the tube 49 the level of the liquid 51 in the outer tubes will be higher than the level within the central tube 49 wherein a positive pressure is being exerted. However, as the airplane approaches its angle of stall so as to reverse the positive pressure within the central tube and cause a suction to be applied instead thereto, the level of the liquid in the central tube will be caused to rise, and that in the outer tubes to drop a corresponding amount, bringing the level of the liquid 51 in all of the tubes toward a condition of equal level. In this manner the instrument may be employed as an indication of when the airplane is approaching its critical angle, or angle of stall, and thus be employed as a warning for a pilot as to the approaching condition.

Likewise, the orifice 53 in being properly positioned may be so arranged that when the airplane is at that attitude conductive to optimum gliding conditions, which is usually about the best for climbing also, the level of the liquid 51 in the three tubes of the instrument will be equal, and in such case it will be apparent that at the angle of stall or at a point closely approaching the same, the level of the liquid in the central tube 49 will exceed the level of the liquid in the outer tubes and thus indicate a dangerous or at best an unnecessarily critical condition.

Where the airplane or other aircraft is driven with a central tractor propeller, as indicated in Fig. 1, it is desirable for accuracy in reading of the instrument to place the orifice outside of the zone of influence of the wash from the propeller 54; and should but one orifice 53 be employed it will be influenced, during turning of the airplane in a horizontal direction, by increase or decrease of the speed of the orifice 53 depending upon which side of the fuselage it is located and the direction of turn. To obviate any slight inaccuracy from this condition, the construction illustrated in Figs. 1, 3 and 4 may be employed.

As indicated in these figures, two orifices 53 are provided, one on each side of the fuselage beyond the tips of the propeller 54. The conduits 52 connecting the orifices with the central instrument tube 49 may be brought together in a common casing such as 56 as indicated in Figs. 3 and 4. The inner ends of the branch tubes 52 may be inwardly bent as at 57 to form valve seats 58. A valve comprising a central stem member 59 suitably supported by a bracket such as 60 for a sliding movement longitudinally and centrally of the branch tubes 52 may be provided with valve heads 61 within each branch tube 52 in normally spaced and cooperative relationship with respect to the valve seats 58. By this means, whenever any difference in suction is exerted between the two orifices 53, the valve mechanism will operate to close or to cut off that orifice upon which the greater pressure or lesser suction is exerted, from communication with the central tube 49 of the instrument; thus the reading of the instrument will correspond to the orifice which is least favorably placed in a turn or roll. Without such valves the instrument will function similarly on a basis of the average pressure from orifices 53.

Due to the speed change and the fact that the orifice or orifices 53 are positioned at a critical point with relation to the wings 38, or for that matter any other airfoil section of the aircraft, the pressure or suction exerted upon the same, compared to the outer orifices 37, will obviously vary with the attitude of the airplane in flight. Consequently, the level of the liquid 51 in the outer tubes 47 and 49 will also vary with respect to the level of the liquid 51 in the central tube 47 in accordance with the attitude of the aircraft, and by this means the pilot may directly determine without any regard to the natural horizon, the attitude of the airplane by observing the relative levels of the liquid in the various tubes. Prompt reaction of the liquid to pitching movements or vertical gusts is further facilitated by the fact that the resulting vertical component of inertia force immediately acts upon the liquid which is normally higher in the small tubes.

This instrument thus provides means for enabling the pilot, without actually seeing the natural horizon, to determine both the lateral position and longitudinal attitude of the airplane, and furthermore, may also serve as an indication of the best gliding or climbing angle of the airplane as well as warning device for indicating an approaching condition of stall. Furthermore, in view of the fact that the suction exerted upon the orifices 37 will vary approximately as the square of the speed, orifices 53 being also progressively affected by change of speed and corresponding angle of attack, as indicated in Figs. 7 and 9, the instrument may be employed as an air speed meter, by providing suitable indicia such as 63 on the support 64 for the instrument and in proximity to one of the outer tubes 47 and 48. When employed for this latter purpose it will of course, be apparent that the above combination of factors will not necessarily induce the liquid in the outer tubes to rise and fall in increments proportional to the change in speed. To provide a more equal change in the height of the liquid in the outer tubes for indicating the speed, filler plugs such as 65 may be inserted in the outer tubes, and a filler plug such as 66 may be inserted in the inner tube 49, one or all of these tubes being varied in cross section throughout its length or in contour so as to result in the desired effect.

In the specific case shown, the contour of the central plug 66 is varied, it being tapered inwardly and upwardly to effect the desired result.

These plugs which may be made of any suitable material, are, of course, of smaller diameter than the diameter of their corresponding tubes, and are preferably provided with projecting fin-like portions such as 67 to guide them in their tubes, and to maintain them against rattling.

The relative change in the level of the liquid in the tubes may also be controlled to a certain extent by varying the diameter of the tubes, it being preferable to make the center of the tube 39 of a greater diameter than the diameter of the outer tubes 47 and 48 for the reason that any displacement of liquid in the central tube is divided equally between the outer tubes.

Alternatively, the above mentioned filler plugs and/or suitable proportioning of the instrument may be employed to give an approximately uniform scale as to longitudinal angle of attack relative to the air, with or without the further addition of a speed scale. The angle scale need not be marked, particularly if the movement of the liquid and the position of the instrument in front of the pilot's eyes are so correlated as to give the change in angle directly as denoted by the change in the line of sight from the pilot's eye position to the level of the liquid in the outer tubes.

The gravity-inertia or bank indicator is also preferably included as an element of the instrument. Instead of providing the type illustrated in Fig. 5, in this case a modified type is preferably employed as indicated in Figs. 7 and 10, in which a housing 68 of triangular formation in front elevation is secured to the support 64 below the instrument tubes, the side walls being formed at their upper ends to present between them a generally cylindrical bearing surface 69 in which is received a cylindrical journal member 70 having rigidly secured thereto, and projecting downwardly therefrom, a fan member 71 weighted at its lower end and, as indicated in Fig. 10, of a size to substantially equal the cross-sectional area of the casing 68. The fan 71 pivoting about the center of the journal 70 will swing to accommodate itself to the gravity inertia resultant of the forces acting upon it, and its movement toward this resultant position will be dampened due to its displacement of air within in the casing 68. An upwardly projecting pin or stem 72 rigidly secured to the journal member 70 and preferably carrying an indicating ball (or pointer) such as 73 is provided for indicating the gravity-inertia resultant for the same purpose as previously described in connection with Fig. 5, except that here the reading is opposite. The advantage of this arrangement is that the pointer is in the same field of vision as the other readings, and may be directly coordinated with them due to the fact that all are now used on the same principle; that is, the airplane is controlled to follow the indicator readings, similarly to following reference marks on the natural horizon, instead of to oppose them as is the case with most instruments hitherto in use.

In order to prevent a loss of the liquid 51 from the instrument during rolling over of the aircraft or flying in upside-down position, a construction equivalent to that explained in connection with Fig. 5 may be employed, or means as illustrated best in Fig. 9 may be employed instead. As illustrated in that figure, the upper ends of the tubes 47, 48 and 49 are closed by cap members such as 76 which in turn are connected to the conduits 52. The inner faces of these cap members where their bore opens into their respective tubes may be tapered or otherwise formed as at 77 to form valve seats, and the upper ends of the plugs 65 and 66 may be tapered complementary to them as at 78 so that if the airplane rolls over or flies upside-down the plugs 65 and 66 in dropping by gravity will engage the seats 77 and thus close the cap 76 to the escape of liquid therefrom. This construction may also be varied as illustrated in Fig. 22 in which the upper end of the tube 47 is shown as provided with a connecting member 79 including a terminal connector 80 for connection to the conduits 52. This connector 79 is internally provided with a floatable ball or other member 81 normally maintained out of tube-closing position by suitable stops such as 82 and adapted to cooperate with the inner end of the end connector 80 to close the bore of the connection. In this case, should fluid from the tube 47 attempt to flow upwardly through the connection 79 for any reason, the ball 81 will float up against the lower end of the end connector 80 and close the bore of the connector to the escape of the liquid, the hydrostatic pressure of the ball on the liquid 81, once it is closed and the liquid is pressing against it, will maintain it in closed position.

As previously described, due to inherent limitations of a device of this type, the difference between the levels of the liquid in the tubes 47 and 48 and the tube 49 does not permit the relative location of the natural horizon when not in view to be as accurately determined by the pilot as is desirable. To overcome the deficiency of the instrument in this respect, the support 64 is mounted for vertical, slidable movement upon a main support 85 best illustrated in Figs. 7, 8 and 9. One edge of the support 64 in such case may be provided with rack teeth such as 86, and a pinion 87 may be mounted upon the main base 85 in position to engage the rack 86. A suitable operating handle such as 88 may be provided for manually operating the pinion 87. In this case, the tube assembly may be raised or lowered as desired, and may be set by the pilot so that at level flying conditions and the normal speeds he may sight the level of the liquids in the outer tubes with a fixed part of the aircraft, and bring it into line with the natural horizon while he is seated in his usual and natural position. Thereafter, should the natural horizon be lost to view, he may maneuver the airplane so as to bring the level of the liquid of the outer tubes again into line with the same fixed part of the airplane, and thus under these conditions bring the airplane to a predetermined longitudinal position relative to the natural horizon, assuming the same gross load and throttle setting. This particular feature of the instrument is especially desirable in connection with the angular coordination previously mentioned, and also more particularly described with reference to a different type of angle-of-attack meter, disclosed in my application for Letters Patent of the United States filed April 28, 1930, on Airplane equipment, and serially numbered 448,001.

It should be understood that for varying load or engine speed the longitudinal indicator then shows the attitude of the airplane relative to the air rather than to the actual horizon, this being preferable for safe control.

The provision of the plugs 65 and 66 within the tubes of the instrument shown in Figures 7 to 10 inclusive, may, of course, be dispensed with and the same variable results obtained by suitably shaping the tubes carrying the liquid. Such a construction is more or less diagrammatically illustrated in Fig. 12, in which the outer tubes 90 and 91 are shown of relatively small diameter and the central tube 92 is shown as being of tapered formation, being of relatively small size at its lower end where it connects with the cross tube 93, and of relatively large size at its upper end where it connects to the tube 52. The amount of taper of the tube 92, in this case, is such as to effect the same result as the amount of taper of the plug 66, in the previous case.

In this particular construction, (Fig. 12) the upper ends of the tubes 90 and 91 are provided with traps 94 and 95, respectively, of similar construction and corresponding principles to the traps 32 described in connection with Fig. 5. No trap, as a separate member, is necessary in connection with the central tube 92 because of the fact of its large diameter at its upper end, the tube 52 may be projected downwardly into it as indicated at 96 to effect an equivalent result.

As prevously suggested, it is not necessary that the orifices at the ends of the various tubes be positioned, in all cases, in a predetermined relationship with respect to the main wings 38 of the airplane, or other necessary airfoil section thereof, but separate members may, if desired, be suitably provided on the aircraft in order to favorably locate such orifices. One manner in which this may be accomplished is illustrated in connection with Fig. 15, in which auxiliary members 98, preferably of airfoil section, are provided at, and may serve as continuations of, the wings 38. The orifices 37 at the outer ends of the tubes 36, in such case, may then be exposed on the lower surface of the corresponding member 98, in the manner illustrated in Figures 16, 18 and 19. As illustrated best in Fig. 18, the lower surface of the member 98 is provided with a protuberance 99, shown in the form of a separate member suitably secured to the under side of the member 98 as by rivets 100, or by any other suitable means. When viewed from the under side of the member 98, the protuberance 99 is preferably of stream lined formation, as best indicated in Fig. 19, and the tube 36 connects with the orifice 37, which, in this case, is preferably provided in the protuberance 99 at the point of greatest depth thereof. The effect of this type of orifice will be substantially the same as that previously described.

Where greater suction effects may be desired within the tube 36, the construction illustrated in Figs. 18 and 19 may be replaced by a construction of the type shown in Fig. 13, which illustrates a member 101 which may be positioned similarly to the protuberance 99 or be otherwise located relative to the aircraft. The member 101 is provided therethrough with a bore 102 of venturi like formation, it being understood that the member 101 is preferably so positioned that the axis of the bore 102 is approximately parallel with the longitudinal axis of the aircraft. The orifice 37, in this case, opens into the throat of the venturi 102, where there is a maximum amount of suction created by the air flowing through the bore 102.

Another manner of forming the orifices for the suction tubes that may, like the construction illustrated in Fig. 18, be positioned substantially anywhere on the aircraft and without regard to a particular airfoil section thereof, is illustrated in Fig. 14. In this case, the tube 36 is extended to and connected with a member 103 of stream-line formation. This member is interiorly provided with passages 104 connecting the bore of the tube 36 with the exterior surface of the member 103 at points near or at the point of maximum diameter of the member 103. The member 103, being positioned with its longitudinal axis approximately parallel to the longitudinal axis of the aircraft, the relative flow of air about it will exert a suction effect within the bores 104 and consequently within the tube 36. This form is shown adjustable in position, a feature which could also be adapted to the type shown in Fig. 18.

The orifice 53 may also be positioned in any convenient or desirable position on the aircraft which gives equivalent results. For instance, a member may be mounted on the stabilizer 106, as illustrated in Fig. 15, and the tube 52 be extended to and connected with an orifice or orifice forming member supported thereby.

The manner in which this may be done is illustrated in Fig. 17, in which the tube 52 is shown as projecting out of the member 105, which is of airfoil section, at a suitable point on the leading edge thereof.

The protuberant construction illustrated in Figs. 18 and 19 may also be adapted for use in connection with the tube 52 connected with the central tube of the instrument. Such construction is illustrated in Figs. 20 and 21, which show a fragmentary plan and a cross section of a wing in which the tubes 36 are provided at their ends with protuberances 99 in the manner previously described. In this case, the tube 52 projects through and opens onto the exterior of a protuberance 108 of a construction similar to the protuberance 99, but located at the leading edge of the wing. The effect of this construction is equivalent to those previously described. The orifice shown in Fig. 14 may also be similarly used. However the orifice 53 may be positioned and formed, it is important to note that the pressure it transmits is made dependent, not on dynamic air pressure alone as in the case of the conventional air speed meter, but on the local pressure and airflow at the particular part of the wing or equivalent surface on which it is mounted.

Where the orifice 53 is located at the rear end of the aircraft as illustrated in Fig. 15, I have found that should, for instance, the engine of the aircraft be checked suddenly while the aircraft is in motion, and thus cause a relatively quick check in the speed of the aircraft, the inertia of the air within the tubes 52 will cause a momentary excess pressure to be applied to the liquid within the central tube of the instrument, and thus cause a momentary drop in the level of the liquid in such tube. This momentary error in reading may be overcome in such cases by positioning the various tubes as illustrated in Fig. 11. In this case the central tube 49 is positioned forwardly of the airplane with respect to the tubes 47 and 48 an amount such that, upon a relative check in the speed of the airplane, the inertia of the liquid in the connecting portion 50 of the tubes will, in attempting to flow forwardly into the central tube 49, counteract the effect of the inertia of the air within the tube 52, and thus eliminate such error.

In connection with the orifices 37 and 53, it will be apparent that in forming them by simply suitably locating the open ends of the tubes 36 or 52, as the case may be, so that the ends of the tubes themselves form the orifices without the addition of parts or members, a satisfactory and fully operable construction is provided, although perhaps not as effective as the special constructions shown, for instance, in Figs. 13, 14, 18 and 21. Accordingly, it will be understood that in the following claims where a suction head, a pressure head, an orifice-forming member, or an equivalent member, is called for and as being connected by a tube or duct to the indicating instrument, such head or member is to be interpreted broadly enough to include an integral end of the connecting tube as well as the special forms referred to.

With the exception of the modification illustrated in Fig. 6, the various forms of my invention heretofore referred to have employed a column of liquid as the indicating medium, this being generally preferable from the view point of simplicity in construction and economy in manufacture. However, it is to be understood that the invention is not to be restricted in this manner as it is quite possible to obtain the same results by a suitably designed and constructed mechanism which is entirely mechanical throughout. Such a construction is, for instance, suggested in Figs. 23, 24 and 25. Referring to these figures, a supporting member 111 is shown which is the equivalent of the supporting member 54 previously described. Upon the supporting member 111 is mounted two parallel spaced tubes 112, their axes preferably being arranged in approximately vertical position when mounted in an aircraft. The lower ends of the cylinders 112 are interiorly connected to the tube 52, previously described through suitable ducts and connections generally indicated at 113. The upper ends of the cylinders 112 are each closed by a centrally apertured cap member 114.

Within each of the cylinders 112 is slidably received a piston indicated in Fig. 23 generally as at 115 and shown in detail in Fig. 24 as comprising a pair of discs 116, between which is clamped a pair of oppositely disposed, cup-shaped washers 117, having feathered edge portions 118 adapted to engage the walls of the cylinder and seal it against passage of air past the piston without setting up sufficient friction to materially interfere with its free movement. Each piston is held in assembled relationship by being clamped against the shoulder 119 formed on the lower end of the corresponding rod 120 by means of a nut such as 121 threaded on the reduced end 122 of such rod.

The rods 120 project upwardly and slidably through the apertured cap 114, a coiled spring such as 123, of relatively light construction, surrounding each of the rods 120 between its corresponding caps 114 and 115 and constantly urging the corresponding piston 115 downwardly in the cylinder.

The upper ends of the rods 120 may be reversely bent as at 130 (best shown in Fig. 25) and extending between these ends is a member 131 preferably of slightly curved conformation, as indicated, which is pivotally connected at one end to one of the ends 130 of the rods 120, and provided with an elongated slot 132 in the opposite end in which the corresponding end 130 of the other rod 120 is engaged.

The upper end of each of the cylinders 112 is connected in any suitable manner with the tubes 36 previously described.

The effects of this construction will obviously be equivalent to the constructions previously described, the difference in pressure in the two tubes 36 causing a consequent difference in position of the corresponding pistons 115 to tip the bar 31 so as to indicate a lateral tilting. The upward movement of the pistons 115 is normally opposed by the springs 123 and the suction within the tube 52, the springs here taking the place of gravity in the liquid type except that they do not react unaided to a slip not involving a turn. Some of this reaction is still induced, however, by the slip itself when using wing tip orifices like 99 in Figs. 18 to 21. This is due to the fact that the air flow under the wing tips normally has a considerable component outward which puts an additional suction in the orifice 37, this effect being the greater on the high wing in a slip. In the same way it is obvious that varying degrees of slip reaction may be induced by varying orientations of the protuberances 99. A scale such as 135 may be employed in conjunction with the bar 131 to serve as an air speed meter as in the cases previously described.

Formal changes may be made in the specific embodiment of the invention described without departing from the spirit and substance of the broad invention, the scope of which is commensurate with the appended claims.

I claim:

1. In combination with an aircraft, a tube with laterally disposed outlets, a member movable therein, a pair of suction heads disposed relative to said aircraft whereby to be affected by relatively different velocities of air with respect to said aircraft, and a duct connecting each of said heads with said tube whereby to affect opposite sides of said member by the pressures therein, each of said heads being connected by its respective duct with that one of said outlets more remote therefrom.

2. In combination with an aircraft, an indicating instrument including a curved tubular member, a column of liquid in said member, the ends of said member being at a higher elevation than the center thereof, and means for impressing opposite ends of said column with pressures varying in accordance with the respective speeds of opposite sides of said aircraft relative to the air, the connection being such that the pressure difference forces the liquid toward the slower moving side of the aircraft.

3. In combination with an aircraft, an indicating instrument including a tubular member, a column of liquid in said member, the ends of said member being at a higher elevation than the center thereof, means for impressing opposite sides of said liquid with pressures varying in accordance with the respective speeds of different points on said aircraft relative to the air, and means for varying the combined levels of said liquid in accordance with the attitude of said aircraft.

4. In combination with an aircraft, a curved tube positioned in an approximately vertical plane transverse to the axis of said aircraft and with its outlets at a greater elevation than the central portion thereof, a column of liquid in said tube, pressure heads disposed in the path of air having a relative flow with respect to said aircraft and on opposite sides of the longitudinal axis thereof, and ducts connecting said heads with the outlets of said tube, the right duct being connected to the left tube outlet and the left duct being connected to the right tube outlet.

5. In combination with an aircraft, a curved tube positioned in an approximately vertical plane transverse to the axis of said aircraft and with its ends at a greater elevation than the central portion thereof, a column of liquid in said tube, pressure heads disposed in the path of air having a relative flow with respect to said aircraft and on opposite sides of the longitudinal axis thereof, ducts connecting each of said heads with that end of said tube on the side of said axis opposite thereto, another pressure head, and a duct connecting the last mentioned pressure head with the bottom of said tube whereby to impress on said column a pressure depending upon the angle of attack of said aircraft.

6. In combination with an aircraft, an indicating instrument including a curved tube and a column of liquid in said tube, a suction head mounted on each side of said aircraft and exposed to the flow of air relative to said aircraft, a duct leading from each of said heads and connecting with the far side of said tube in each case, the dimension of said liquid column transversely of said aircraft bearing an approximately predetermined relation with respect to the distance between said heads in a direction transversely of the length of said aircraft.

7. In combination with an aircraft, an indicating instrument inclding three vertically arranged tubes intercommunicating adjacent their bottoms, a mass of liquid in said tubes, a head on each side of said aircraft and a third head therebetween exposed to and variably affected by the flow of air relative to said aircraft, ducts connecting the first two heads with the upper ends of the outer of said tubes respectively, and a duct connecting said third head with the center tube.

8. In combination with an aircraft, an indicating instrument including a pair of vertically arranged tubes intercommunicating adjacent their bottoms, said tubes being substantially aligned transversely of said aircraft, a mass of liquid in said tubes, a head disposed on each side of said aircraft exposed to and affected by the flow of air relative to said aircraft, and a duct connecting each of said heads with the upper end of that one of said tubes more remote therefrom.

9. In combination with an aircraft, an indicating instrument including three vertically extending tubes intercommunicating adjacent their bottoms, two of said tubes being substantially aligned transversely of said aircraft, a mass of liquid in said tubes, a head disposed on each side of said aircraft exposed to and affected by the flow of air relative to said aircraft, a third and similar head disposed between the first mentioned heads, a duct connecting each of said first mentioned heads with the upper end of that one of said two tubes most remote therefrom, a duct connecting said third head with said third tube, a support for said tubes, and a scale on said support cooperating with the level of said liquid in said two tubes to indicate the approximate speed of said aircraft relative to the air in which it is traveling.

10. In combination with an aircraft, an indicating instrument including a pair of approximately vertical tubes intercommunicating adjacent their bottoms, said tubes being substantially aligned transversely of said aircraft, a mass of liquid in said tubes, a head disposed on each side of said aircraft exposed to and affected by the flow of air relative to said aircraft, a duct connecting each of said heads with the upper end of that one of said tubes more remote therefrom, a support for said tubes, a main support for the first mentioned support, and means for vertically adjusting said first mentioned support relative to said main support.

11. In combination with an aircraft, an indicating instrument including a pair of vertically arranged tubes intercommunicating adjacent their bottoms, a container intercommunicating with said tubes, said tubes being substantially aligned transversely of said aircraft, a mass of liquid in said tubes, a head disposed on each side of said aircraft exposed to and affected by the flow of air relative to said aircraft, a duct connecting each of said heads with the upper end of that one of said tubes more remote therefrom, a third head communicating with said container, a support for said tubes, a main support for the first mentioned support, and means for vertically adjusting said first mentioned support relative to said main support.

12. In combination, an aircraft having an orifice at each of three separate points thereon, each orifice being in a position to react to pressure caused by the velocity of flight, an indicating instrument for said aircraft comprising three approximately vertical tubes intercommunicating only adjacent their bottoms, a mass of liquid in said tubes, a separate pressure connection adjacent the upper end of each of said tubes and means connecting each of said pressure connections with a corresponding of said orifices.

13. In combination, an aircraft, a pair of separated nozzles thereon the interiors of which are subject to suction varying in value with the velocity of flight of the aircraft, a third nozzle the interior of which is subject to a variable pressure or suction depending upon the attitude of the aircraft, an indicating instrument for the aircraft comprising three generally vertical tubes intercommunicating adjacent their bottoms and arranged in triangular formation, a mass of liquid in said tubes, and a separate pressure connection between the upper portion of each of said tubes and the corresponding of said nozzles.

14. In an aircraft having an airfoil, in combination, two approximately vertical pressure indicating means spaced transversely of said aircraft, a low pressure head disposed on each side of said aircraft and each separately connected to one of said two means, and a third pressure head positioned adjacent the leading edge of said airfoil connected to and acting simultaneously upon both of said indicating means to show the difference in pressure between the third head and each of the other two heads respectively.

15. A pressure indicating instrument for aircraft and the like comprising a pair of hollow members intercommunicating adjacent one end thereof, a movable sealing element in each of said members, indicating means connected to corresponding ends of said members, a pressure connection for each of said members between said sealing element therein and the noncommunicating end thereof, and a third pressure connection common to both of said members at the intercommunicating ends thereof.

16. An indicating instrument for aircraft and the like comprising a pair of hollow members connected together adjacent one end thereof, a movable sealing element in each of said members, a rod connected to each of said elements and projecting through corresponding ends of said members, a pressure connection for each of said members between said element therein and the unconnected ends thereof, a pressure connection communicating with the connected ends of said members, and an indicating bar connecting said rods externally of said members.

17. An indicating instrument for aircraft and the like comprising a pair of cylinders connected together adjacent one end thereof, a piston in each of said cylinders, rods attached to said pistons projecting through corresponding ends of said cylinders, indicating means actuated by said rods, a pressure connection for each of said cylinders between its piston and the unconnected end of said cylinder, a third pressure connection communicating with the connected ends of said cylinders, and spring means constantly urging said pistons in one direction.

18. In an aircraft having wing and wing tips or like airfoil members, an indicating device including three interrelated elements each adapted to be motivated by outside air pressure and two of them serving as indicators, means for impressing upon the two said indicating elements the dynamic suction of the air adjacent said wing tips, means for impressing upon the third element positive or negative dynamic pressure of the air adjacent the leading edge of said wings, and means interconnecting said elements whereby movement of any one affects the movement of the other two.

19. In an aircraft having wing and wing tips or like airfoil members, an indicating device including three elements operatively associated with each other and each adapted to be motivated by outside air pressure, means for impressing upon two of said elements the dynamic suction of the air adjacent said wing tips, means for impressing upon the third element positive or negative pressure of the air adjacent the leading edge of said wings, and means interconnecting said elements whereby movement of any one affects the movement of the other two thereof, said second mentioned means cooperating with said elements to effect a substantially equal reading of all of said elements for straight level flight of said aircraft at an attitude corresponding to stalling or near stalling condition thereof.

20. In combination with an aircraft, three laterally spaced pressure heads supported thereon in a position to be acted upon by a simultaneous difference in air velocities relative thereto during operation of said aircraft, the central one of said heads being positioned to be affected by either positive or negative air pressures dependent upon the longitudinal attitude of said aircraft, an indicating instrument adapted to be operated by the difference in pressure between the central head and each of the other two heads respectively, and ducts connecting the three heads separately to said instrument.

21. In combination with an aircraft, three pressure heads supported thereon in a position to be affected by a simultaneous difference in air velocities relative thereto during operation of the aircraft, two of said heads being oppositely disposed relative to and at substantial distances from the longitudinal center line of said aircraft, and affected mainly by the wing tip speed, the other of said heads being located intermediate of said two heads and affected mainly by the mean speed and angle of attack, two indicating elements operable by the respective pressure differences between said intermediate head and each of the other two heads, a duct connecting each of said oppositely disposed heads separately with said elements, and a duct connecting the intermediate head to both said indicating elements.

22. In combination with an aircraft, two liquid columns and a container, all intercommunicating a material distance below their tops, air ducts leading from orifices on opposite sides of said aircraft to the tops of said columns and communicating thereto pressures varying with the speeds of points on opposite sides of said aircraft, and a similar duct leading to said container from a third pressure orifice communicating thereto pressures varying with the attitude of said aircraft for varying the combined movement of said columns.

23. In an aircraft, in combination, a pair of orifice forming members located on opposite sides of the aircraft and positioned to be affected by pressures not substantially greater than atmospheric pressure, a pressure generating means near the central axis of said aircraft, two columns of liquid connected with a container, a separate connection between each of said orifice forming members and said column most remote therefrom, and a connection between said central pressure generating means and said container.

24. In combination with an aircraft, an indicating instrument including three vertically arranged tubes intercommunicating adjacent their bottoms, a mass of liquid in said tubes, a head on each side of said aircraft and a third head therebetween exposed to and variably affected by the flow of air relative to said aircraft, a duct connecting the first two heads with the upper ends of the outer of said tubes respectively, a duct connecting said third head with the upper end of the center tube and a liquid trap at the top of each of said tubes.

25. In an aircraft having wings or wing tips or like members, two intercommunicating indicator elements each adapted to be motivated by outside air pressures, means for impressing upon one of said elements the dynamic suction of the air adjacent one of said wing tips, means for impressing upon the other of said elements the dynamic suction of the air adjacent the other of said wing tips, and means for modifying the movement of said elements in accordance with the sense and degree of pressure of the air adjacent the leading edge of said wings.

26. In an aircraft having wings, wing tips or other airfoil members, an indicator including a pair of elements movable in response to three sources of pressure, means for impressing upon one of said elements the dynamic suction adjacent one end of a wing, means for impressing upon the other of said elements the dynamic suction adjacent one end of another wing, and means for impressing upon both of said elements positive or negative atmospheric pressure of the air adjacent the leading edge of an airfoil member.

27. An indicating instrument for aircraft and the like including a pair of hollow members each having a wall movable in response to pressure variations thereon, an independent pressure connection for each of said members whereby to subject one side of the corresponding wall to a variable pressure, another pressure connection communicating with the opposite sides of both of said walls whereby to subject said opposite sides simultaneously to a variable pressure which may be different from the first mentioned pressure, and indicating means movable in response to movement of said walls.

RALPH H. UPSON.